United States Patent
Makkar et al.

(10) Patent No.: US 11,401,994 B2
(45) Date of Patent: Aug. 2, 2022

(54) AIR SPRING GAITERS WITH FLOATING RING

(71) Applicant: Continental Automotive Systems, Inc., Auburn Hills, MI (US)

(72) Inventors: Sunny Makkar, Troy, MI (US); Joseph Jerisk, Grand Blanc, MI (US); Garrett Mark Pniewski, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/949,616

(22) Filed: Nov. 6, 2020

(65) Prior Publication Data

US 2021/0140506 A1 May 13, 2021

Related U.S. Application Data

(60) Provisional application No. 62/932,768, filed on Nov. 8, 2019.

(51) Int. Cl.
 *F16F 9/38* (2006.01)
 *F16F 9/36* (2006.01)
 *F16F 9/04* (2006.01)

(52) U.S. Cl.
 CPC ............ *F16F 9/361* (2013.01); *F16F 9/0418* (2013.01); *F16F 9/0445* (2013.01)

(58) Field of Classification Search
 CPC ........ F16F 9/0418; F16F 9/0445; F16F 9/361; F16F 9/38
 See application file for complete search history.

(56) References Cited

U.S. PATENT DOCUMENTS

| | | | |
|---|---|---|---|
| 6,227,527 B1 | 5/2001 | Berg | |
| 8,979,076 B2 * | 3/2015 | Oldenettel | F16F 9/38 267/64.27 |
| 9,435,393 B2 * | 9/2016 | Gleu | B60G 15/12 |
| 9,512,895 B2 | 12/2016 | Behmenburg et al. | |
| 10,221,913 B2 * | 3/2019 | Jasinski | F16F 9/38 |
| 10,442,266 B2 * | 10/2019 | Pniewski | F16F 9/0454 |
| 10,451,136 B2 * | 10/2019 | Jerisk | F16F 9/05 |
| 10,900,538 B2 * | 1/2021 | Pniewski | F16F 9/437 |
| 2009/0200718 A1 * | 8/2009 | Roemer | B60G 17/0521 267/123 |

(Continued)

FOREIGN PATENT DOCUMENTS

| DE | 10323332 A1 | 12/2004 |
|---|---|---|
| DE | 102006052627 A1 | 5/2008 |

(Continued)

OTHER PUBLICATIONS

International Search Report and the Written Opinion of the International Searching Authority dated Feb. 8, 2021 for the counterpart PCT Application No. PCT/US2020/070759.

*Primary Examiner* — Thomas W Irvin

(57) ABSTRACT

An assembly for an air spring includes an outer gaiter defined in part by an interior portion, an inner gaiter defined in part by an exterior portion, at least one floating ring extending from a first floating ring end to a second floating ring end, the first floating ring end coupled with the inner gaiter and the second floating ring end is coupled with the outer gaiter, where the at least one floating ring allows the outer gaiter to move relative to the inner gaiter.

17 Claims, 3 Drawing Sheets

(56) References Cited

U.S. PATENT DOCUMENTS

| | | | | |
|---|---|---|---|---|
| 2012/0112392 A1* | 5/2012 | Oldenettel | ................ | F16F 9/38 267/64.27 |
| 2015/0159725 A1* | 6/2015 | Gleu | ........................ | F16F 9/05 267/64.24 |
| 2016/0107496 A1* | 4/2016 | Pielock | ................. | F16F 9/0445 267/64.27 |
| 2021/0062886 A1* | 3/2021 | Marchel | .................... | F16F 9/38 |

FOREIGN PATENT DOCUMENTS

| | | | |
|---|---|---|---|
| FR | 2875879 | A1 | 3/2006 |
| WO | 2007144223 | A1 | 12/2007 |
| WO | 2008037319 | A1 | 4/2008 |

\* cited by examiner

AIR SPRING GAITERS WITH FLOATING RING

CROSS-REFERENCE TO RELATED APPLICATIONS

This application is a continuation in-part of U.S. Patent Application No. 62/932,768, filed Nov. 8, 2019. The disclosure of the above application is incorporated herein by reference.

TECHNICAL FIELD

A telescopic air spring assembly having a gaiter with floating ring.

TECHNICAL BACKGROUND

Suspension systems for automotive vehicles provide vehicle passengers with a more comfortable ride. Air suspension systems utilize air springs, rather than traditional coil springs, and provide different suspension qualities that may be preferable in some vehicles to traditional coil spring suspensions.

A conventional air spring is a device that is arranged between a vehicle body and chassis. The typical air spring has at least one working space, or cavity that is filled with compressed air. Space constraints can limit the amount of working space for the air spring assembly, especially as vehicles are designed with tighter and tighter space constraints.

Accordingly, there exists a need for an air spring assembly with reduced total compressed height.

SUMMARY

In one or more embodiments, an assembly for an air spring includes an outer gaiter defined in part by an interior portion, an inner gaiter defined in part by an exterior portion, at least one floating ring extending from a first floating ring end to a second floating ring end, the first floating ring end coupled with the inner gaiter and the second floating ring end is coupled with the outer gaiter, where the at least one floating ring allows the outer gaiter to move relative to the inner gaiter.

In one or more embodiments, at least a portion of the inner gaiter is disposed within the outer gaiter.

In one or more embodiments, the outer gaiter and the inner gaiter are telescoping relative to each other.

In one or more embodiments, the at least one floating ring includes a side flange coupled to at least one of the inner gaiter or the outer gaiter.

In one or more embodiments, the inner gaiter is coupled with the floating ring one or more of clamps, snap fit, a weld joint, or overmolding.

In one or more embodiments, the outer gaiter is coupled with the floating ring one or more of clamps, snap fit, a weld joint, or overmolding.

Further areas of applicability of the present embodiments will become apparent from the detailed description provided hereinafter. It should be understood that the detailed description and specific examples, are intended for purposes of illustration only and are not intended to limit the scope of the claims.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
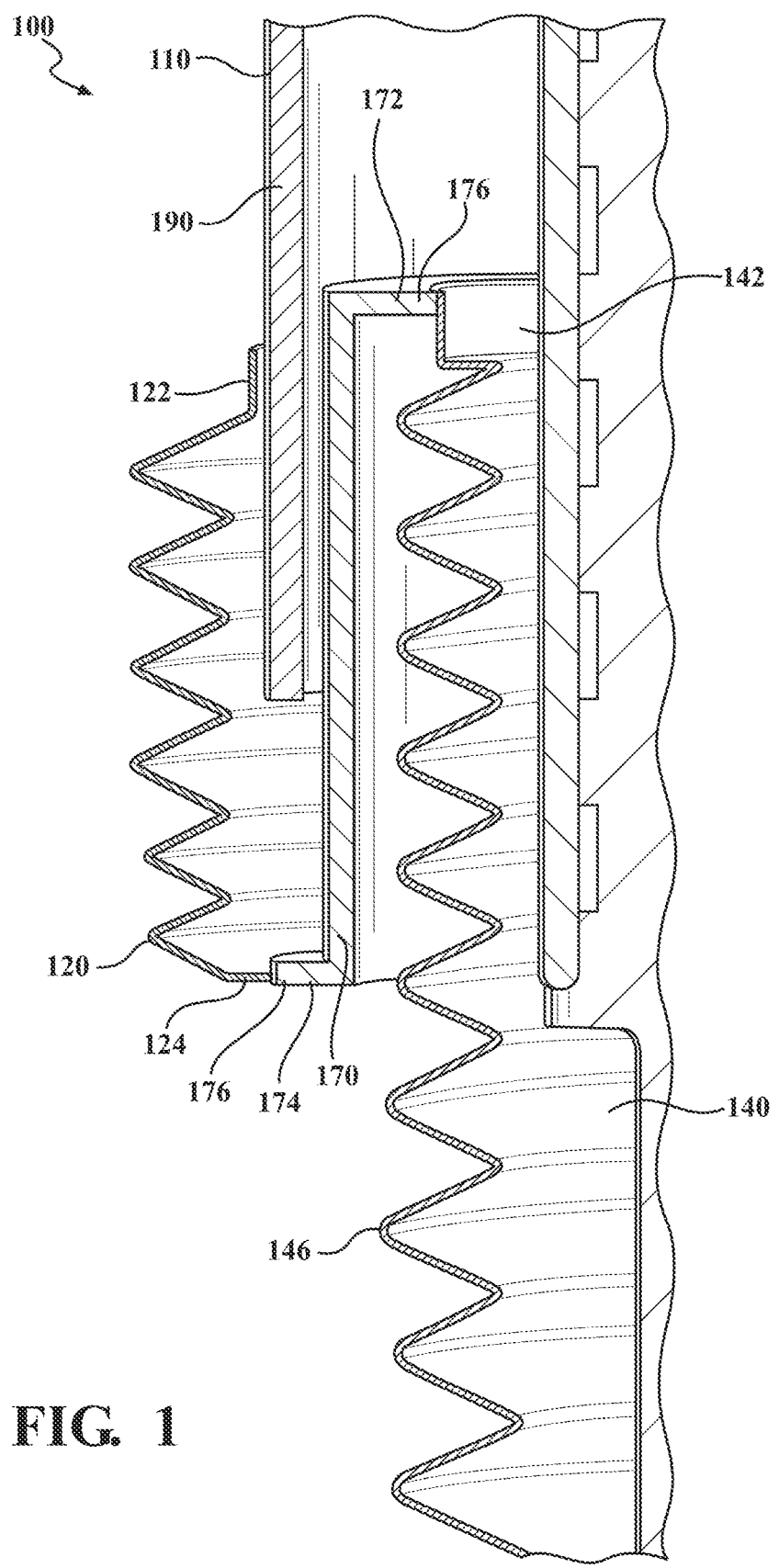
FIG. 1 is a perspective sectional view of a portion of an air spring assembly, according to one or more embodiments.
Figure 2:
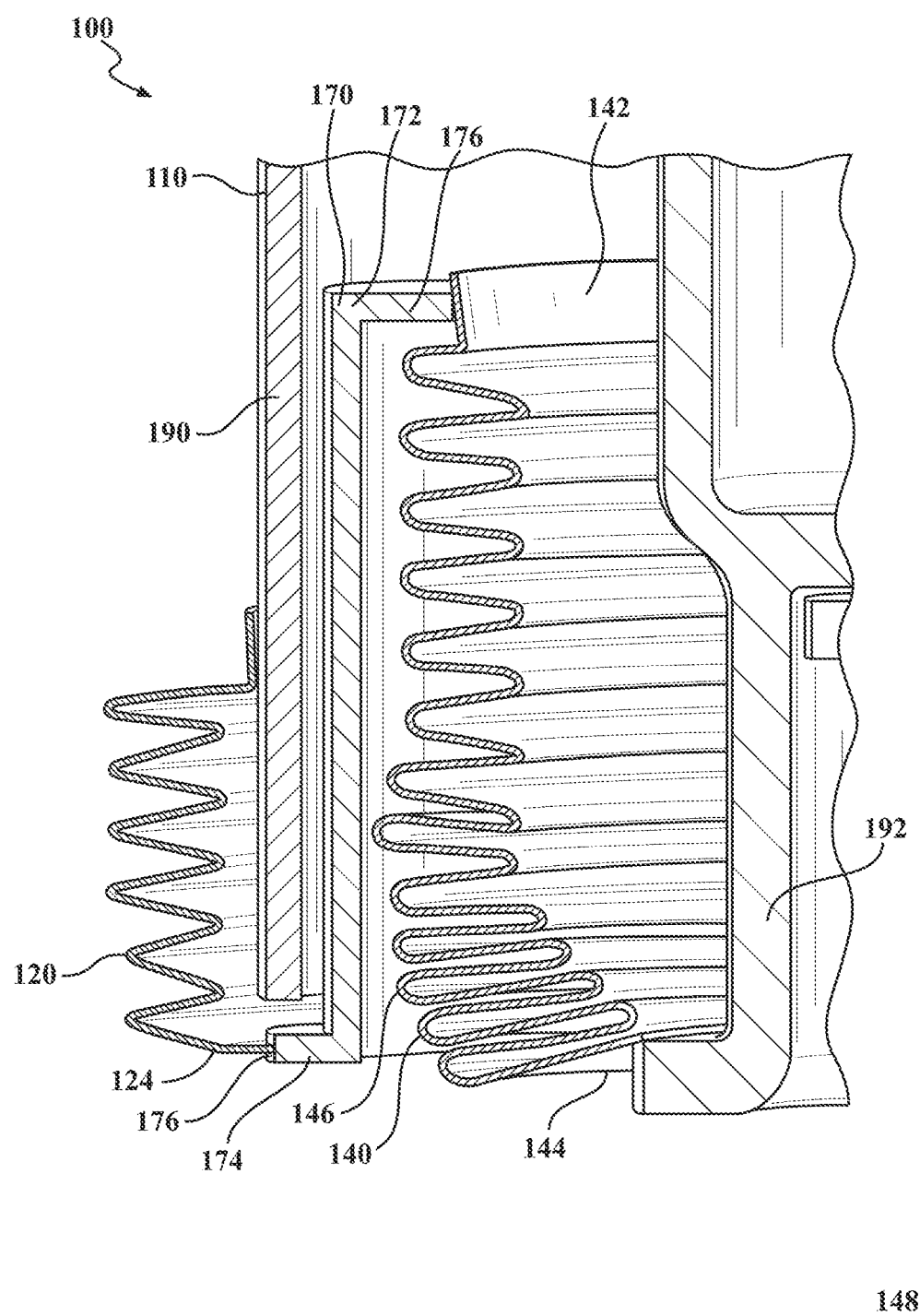
FIG. 2 is a perspective sectional view of a portion of an air spring assembly, according to one or more embodiments.
Figure 3:
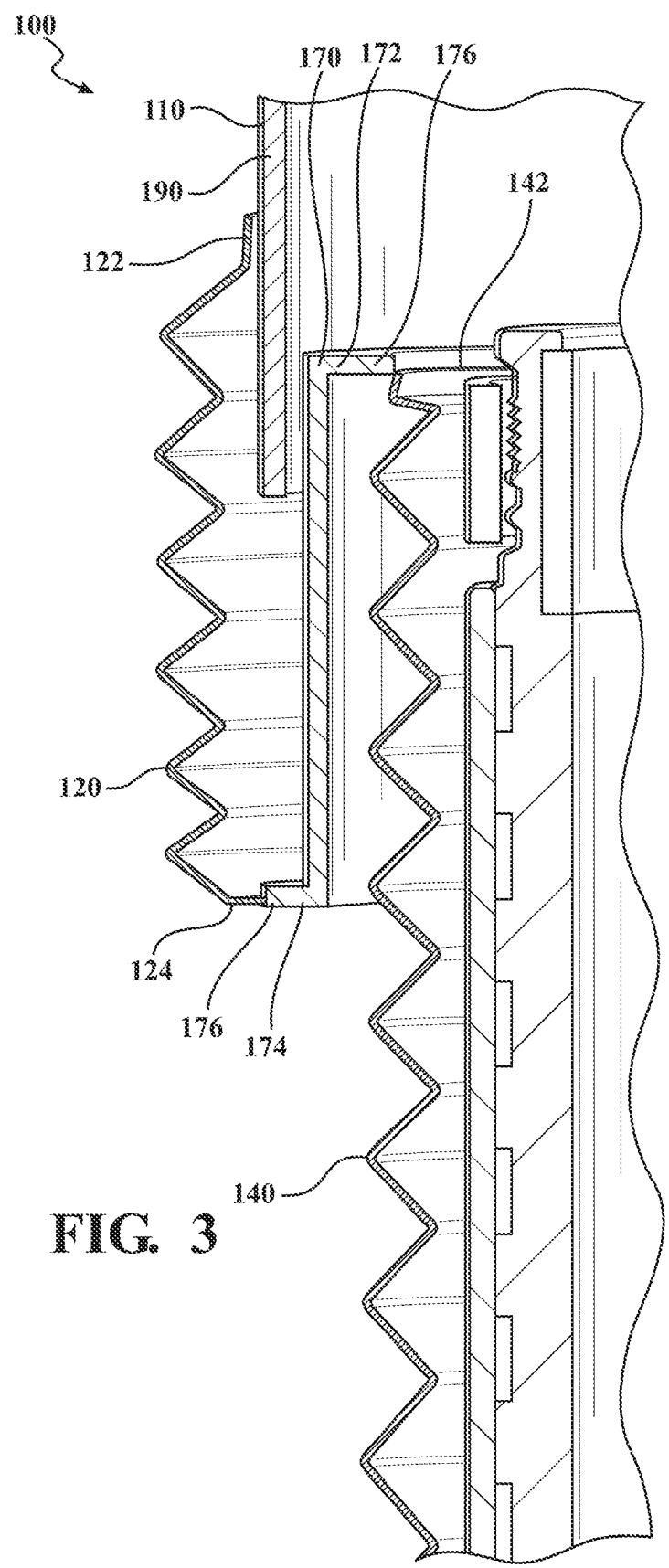
FIG. 3 is a perspective sectional view of a portion of an air spring assembly, according to one or more embodiments.

An air spring assembly 100 includes a gaiter assembly 110, as shown in FIGS. 1-3. The gaiter assembly 110 includes an outer gaiter 120 and an inner gaiter 140. The outer gaiter 120 extends from an outer gaiter first end 122 to an outer gaiter second end 124, and is defined in part by an interior portion and an outer gaiter longitudinal axis 148. In one or more embodiments, the outer gaiter 120 is coupled with a guide tube 190 at the outer gaiter first end 122.

The inner gaiter 140 extends from an inner gaiter first end 142 to an inner gaiter second end 144. The inner gaiter 140 is defined in part by an exterior portion 146 and an inner gaiter longitudinal axis 148. In one or more embodiments, the inner gaiter 140 is coupled with the piston 192 (or shock absorber/damper) at the inner gaiter second end 144.

The outer and inner gaiters 120, 140 may include folded materials, rubber/EPDM material that folds in reverse of an airspring bellow, elastic material, corrugated gaiters, for example. The outer and inner gaiters 120, 140 are extendable and collapsible along their respective longitudinal axes. In one or more embodiments, the outer gaiter 120 has a larger internal diameter than an external diameter of the inner gaiter 140.

In one or more embodiments, the gaiter assembly 110 further includes a floating ring 170, which extends from a floating ring first end 172 to a floating ring second end 174. The floating ring 170 may be formed or machined from metal, plastic, NBR, or rubber, for example. The floating ring 170 connects the outer gaiter 120 with the inner gaiter 140, and allows the outer gaiter 120 to be telescopically disposed relative to the inner gaiter 140. In one or more embodiments, the floating ring 170 has a "Z" shaped cross-section and/or is substantially cylindrical in shape. In one or more embodiments, the floating ring 170 includes one or more flanges 176 that extend outward from at least one of the floating ring first end 172 and/or the floating ring second end 174. In one or more embodiments, the one or more flanges 176 extend substantially perpendicular from a floating ring longitudinal axis 178. It should be noted that the inner and outer gaiter longitudinal axis 148 and the floating ring longitudinal axis 178 are in alignment with one another. However, it is within the scope of the invention that the outer gaiter 120, the inner gaiter 140, and the floating ring 170 may be positioned relative to one another and shaped such that the axes 148,178 may not be aligned with one another.

During use of the gaiter assembly 110, for example within an air spring assembly 100 used, for example, with a vehicle, the inner gaiter 140 telescopes within the outer gaiter 120 in the compressed position as shown in FIG. 2, which assists in greatly reducing the block height, solving the space issues within a vehicle. In one or more embodiments, when the gaiter assembly 110 is in the compressed position, the inner gaiter second end 144 is disposed at substantially the same longitudinal position as the outer gaiter second end 124, as shown in FIG. 2.

In one or more embodiments, the floating ring first end 172 is coupled with the inner gaiter 140 and the floating ring second end 144 is coupled with the outer gaiter 120. In one or more embodiments, the floating ring 170 is coupled with the inner gaiter 140 with one or more of clamps, snap fit, a weld joint, or overmolding. In one or more embodiments, the floating ring 170 is coupled with the outer gaiter 120 with one or more of clamps, snap fit, a weld joint, or overmolding.

The embodiments herein solve the packaging problem of air spring gaiter with very small or negative packaging space for the gaiter block height. Due to the telescopic construction enabled by the floating ring, the total compressed height of the gaiter is significantly reduced. This helps to package the gaiter in limited spaced, and further allows for the gaiter to cascade within itself.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

What is claimed is:

1. An air spring assembly comprising:
   a piston;
   an inner gaiter coupled to the piston;
   an outer gaiter; and
   a floating ring coupled between the inner gaiter and the outer gaiter.

2. The air spring assembly as recited in claim 1, wherein the inner gaiter is configured to telescope within the outer gaiter.

3. The air spring assembly as recited in claim 1, wherein a first diameter of the outer gaiter is greater than a second diameter of the inner gaiter.

4. The air spring assembly as recited in claim 1, wherein the floating ring comprises:
   a first flange coupled to the inner gaiter; and
   a second flange coupled to the outer gaiter.

5. The air spring assembly as recited in claim 1, further comprising:
   one or more of clamps, snap fit, a weld joint, or overmolding,
   wherein the inner gaiter is coupled to the floating ring by the one or more of clamps, snap fit, weld joint, or overmolding.

6. The air spring assembly as recited in claim 1, further comprising:
   one or more of clamps, snap fit, a weld joint, or overmolding,
   wherein the outer gaiter is coupled to the floating ring by the one or more of clamps, snap fit, weld joint, or overmolding.

7. The assembly as recited in claim 1, wherein the floating ring comprises a top end and a bottom end, and
   wherein the top end of the floating ring is coupled to a top end of the inner gaiter and the bottom end of the floating ring is coupled to a bottom end of the outer gaiter.

8. An air spring assembly, comprising:
   an outer gaiter;
   a floating ring connected to the outer gaiter; and
   an inner gaiter connected to the floating ring,
   wherein the outer gaiter and the inner gaiter move relative to one another in a telescoping manner when force is applied to the air spring assembly.

9. The air spring assembly of claim 8, wherein the floating ring comprises:
   a plurality of flanges, the plurality of flanges comprising a first flange
   integrally formed as part of a floating ring first end and connected to the inner gaiter and a second flange
   integrally formed as part of a floating ring second end and connected to the outer gaiter,
   wherein the first flange extends away from the floating ring in a direction opposite to a direction in which the second flange extends away from the floating ring.

10. The air spring assembly of claim 8, further comprising:
    a piston connected to the inner gaiter; and
    a guide tube connected to the outer gaiter.

11. The air spring assembly of claim 10, further comprising:
    an end of the inner gaiter connected to the piston; and
    an end of the outer gaiter connected to the floating ring,
    wherein the end of the inner gaiter connected to the piston is disposed at a longitudinal position that is substantially the same as the end of the outer gaiter connected to the floating ring when the air spring, assembly is in a compressed position.

12. The air spring assembly of claim 10, wherein as the air spring assembly is changed between the compressed position and a decompressed position, the piston and the guide tube move relative to one another, and the floating ring moves relative to both the piston and the guide tube.

13. The air spring assembly of claim 8, the floating ring is formed to have a Z-shaped cross section.

14. The air spring assembly of claim 8, wherein a portion of the outer gaiter circumscribes at least a portion of the inner gaiter, independently of a position of the floating ring.

15. The air spring assembly of claim 8, wherein the floating ring circumscribes a portion of the inner gaiter.

16. The air spring assembly of claim 8, wherein a portion of the outer gaiter circumscribes the floating ring.

17. The air spring assembly of claim 8, wherein a portion of the outer gaiter circumscribes at least a portion of the inner gaiter.

* * * * *